H. KURTH.
GRAIN-SEPARATORS.

No. 188,641. Patented March 20, 1877.

4 Sheets—Sheet 3.

H. KURTH.
GRAIN-SEPARATORS.

No. 188,641. Patented March 20, 1877.

WITNESSES:
W. W. Hollingsworth
Edw. W. Byrn

INVENTOR:
Hermann Kurth
BY
ATTORNEYS.

4 Sheets—Sheet 4.

H. KURTH.
GRAIN-SEPARATORS.

No. 188,641. Patented March 20, 1877.

WITNESSES:
W. W. Hollingsworth
Edw. W. Byrn

INVENTOR:
Hermann Kurth
BY
ATTORNEYS.

UNITED STATES PATENT OFFICE.

HERMANN KURTH, OF MILWAUKEE, WISCONSIN.

IMPROVEMENT IN GRAIN-SEPARATORS.

Specification forming part of Letters Patent No. 188,641, dated March 20, 1877; application filed March 10, 1877.

*To all whom it may concern:*

Be it known that I, HERMANN KURTH, of the city and county of Milwaukee, and State of Wisconsin, have invented a new and Improved Cockle-Separator; and I do hereby declare that the following is a full, clear, and exact description of the same, reference being had to the accompanying drawing, forming part of this specification, in which—

Figure 1:
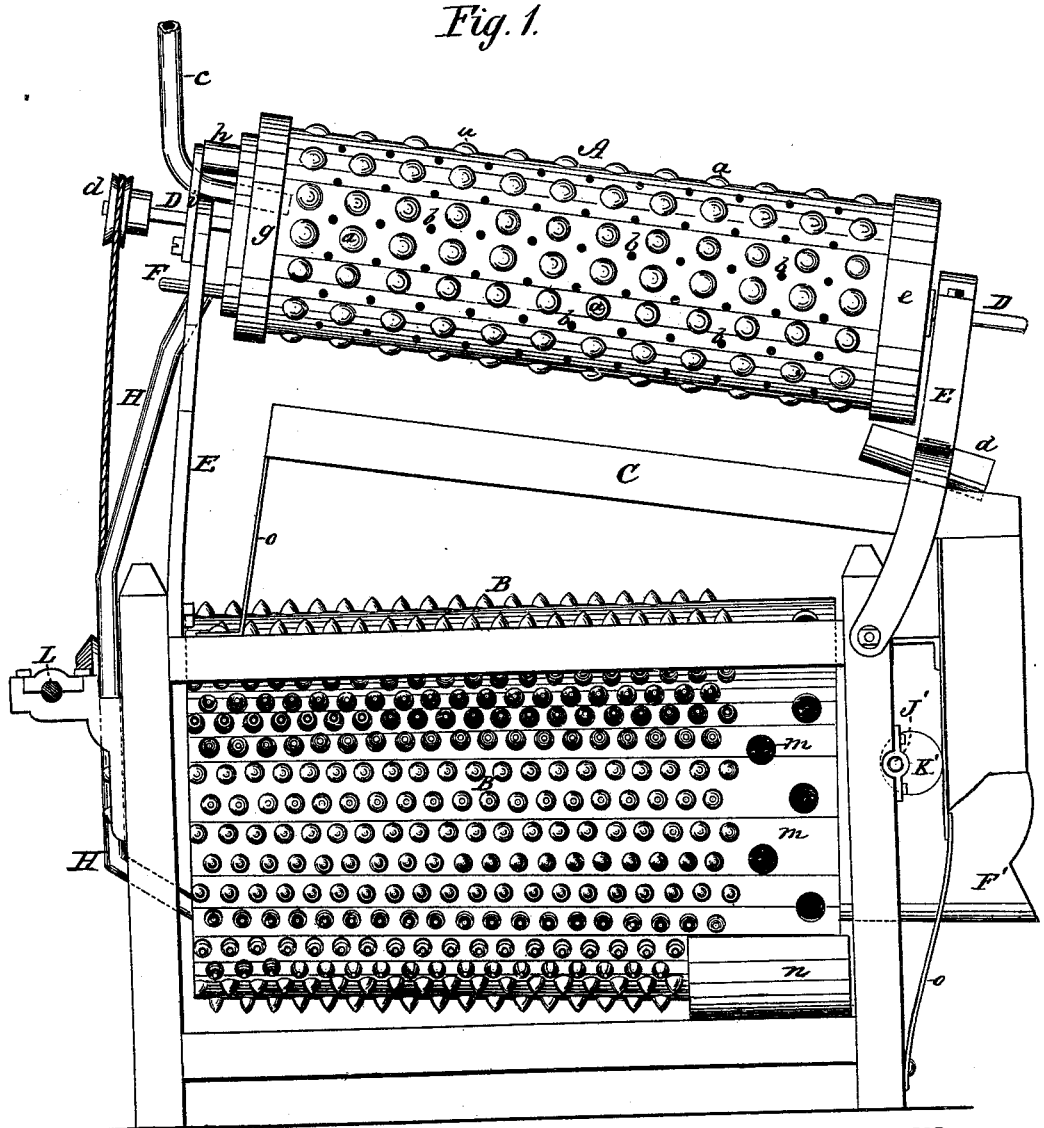
Figure 2:
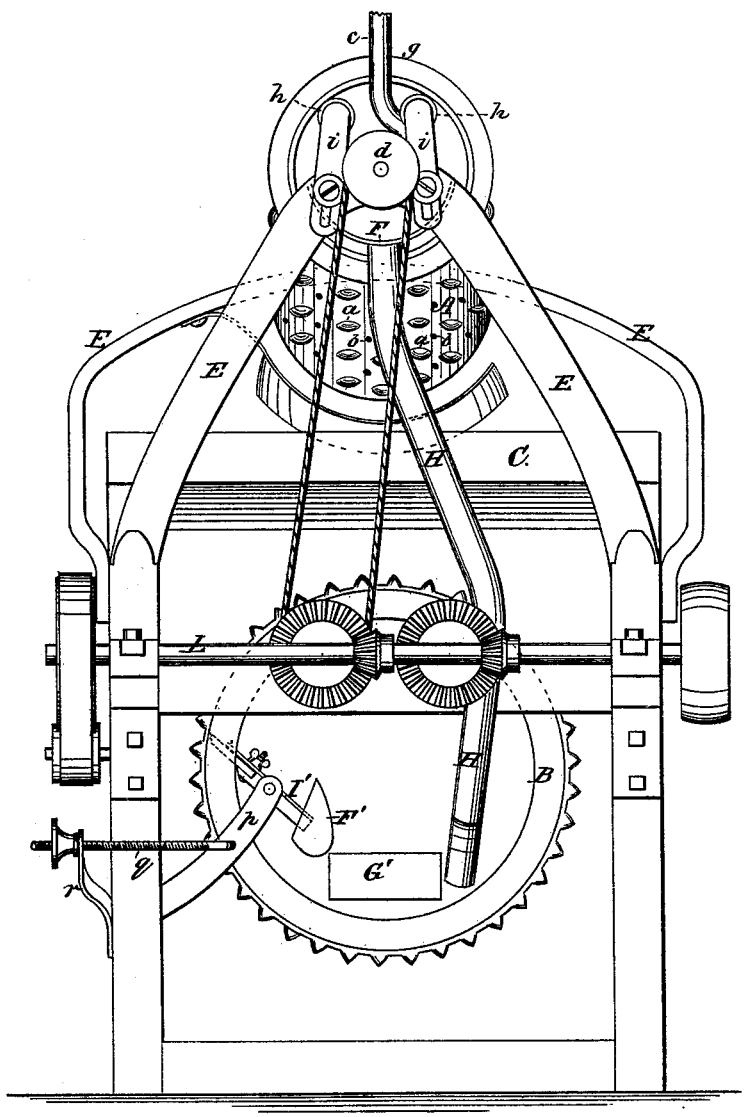
Figure 3:
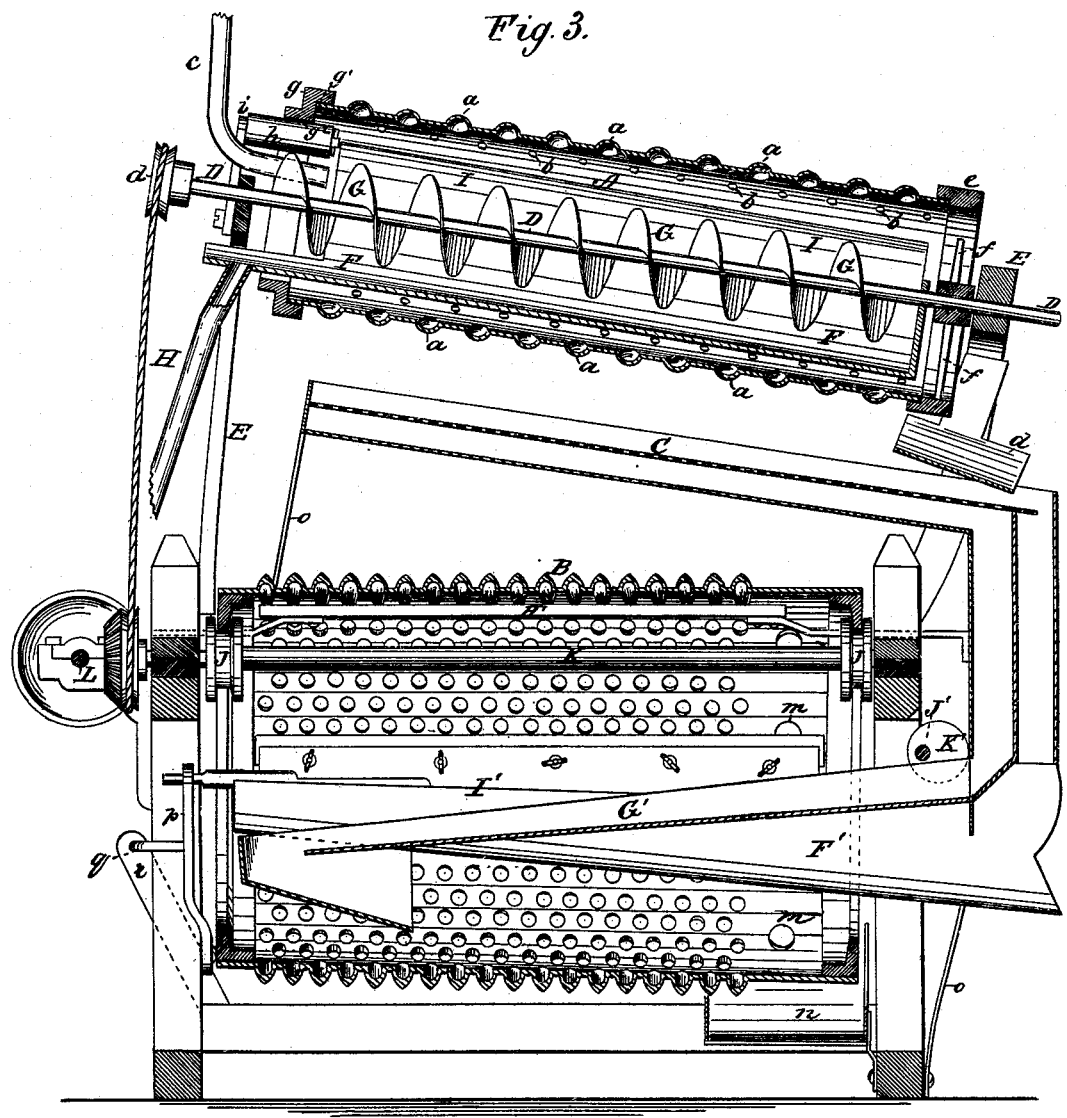
Figure 7:
Figure 4:
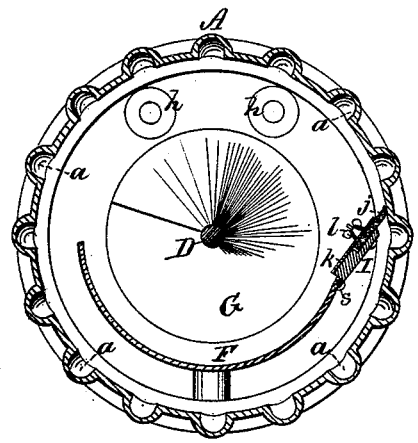
Figure 5:
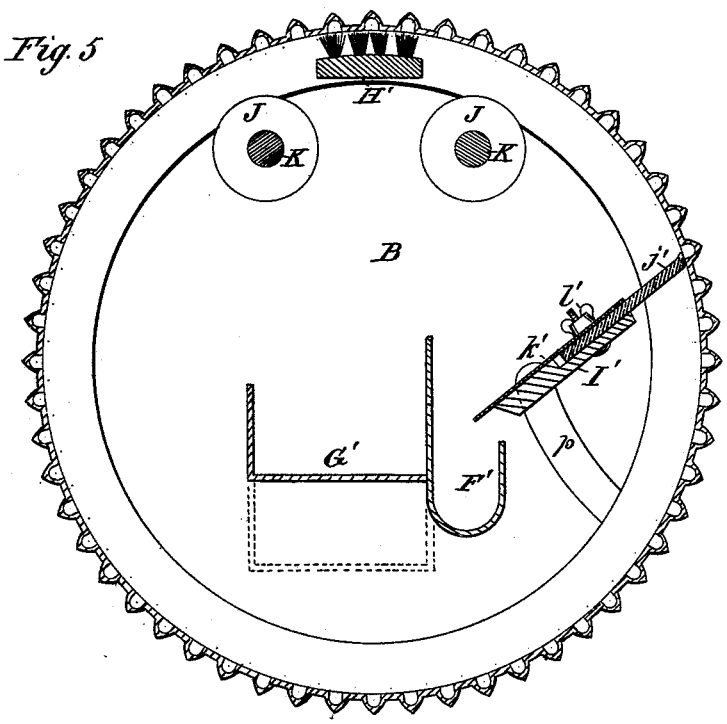
Figure 6:
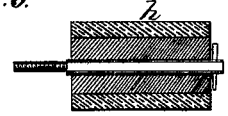

Figure 1 is a side elevation; Fig. 2, an end elevation; Fig. 3, a vertical longitudinal section; Fig. 4, a transverse section of the cylinder A; Fig. 5, a transverse section of cylinder B; Fig. 6, a detail sectional view of the supporting-rollers $h$; Fig. 7, an enlarged section of one of the cavities, having conical projections upon the outside.

My invention is an improvement in grain-separators, designed to separate cockle and other small seed and impurities from the wheat or other grain.

The invention belongs to that class of separators in which a revolving cylinder, having indented inner cavities, is made to catch the small impurities, such as cockle, foreign seed, dirt, &c., and to deliver them to a trough or pan which separates and carries them out of the cylinder apart from the clean grain.

The main features of the improvement consist, first, in locating above the main indented cylinder one or more indented cylinders, whose cavities or indentations are larger than those of the lower cylinder, the same being designed to separate the large wheat from the small wheat and impurities, and to take the place of sieves ordinarily employed for this purpose; secondly, in constructing the cylinder with both indentations, or cavities, and perforations, which perforations are separate from and independent of the cavities, and serve to effect the preliminary separation of the fine seed and dirt; thirdly, in arranging the cylinders with one end free from, and the other end attached to, the central shaft, so as to work a conveyer and deliver cockle, &c., at opposite end of the cylinder from clean grain; fourthly, improved construction of catch-board for removing cockle and impurities from cavities of cylinder and delivering them to trough; fifthly, in the improved arrangement of the metal of the cylinder in forming the cavity designed to increase the durability of the said cylinder.

The improvement also covers other features of minor importance, which will be hereinafter fully described.

In the machine about to be described the two leading elements are the upper cylinder A and the lower one, B, of which the upper cylinder A receives the commingled grain and impurities from the delivery-spout, and serves to effect a preliminary separation by removing from the crude bulk the largest grains of wheat, and the smallest grains of the impurities, while the cockle and small grains of wheat are delivered to the lower cylinder B, which finishes the work by separating the small wheat and large impurities, which are more nearly of a size.

In connection with the devices which I claim as new in this application, I have shown a shaker-sieve, C, which does not differ from other sieves used in this connection, except in point of location above the cylinder, and which sieve has no function in this machine when the cylinder A is used, but is simply introduced as auxiliary to an understanding of the function of cylinder A. In the preliminary treatment of the grain in bulk, as heretofore practiced, the sieve C was employed, but the use of the same is objectionable, for the reason that the larger grains of wheat soon wedge themselves into the interstices of the sieve, and either require the constant attention of the miller, or else prevent the proper preliminary separation. In the place of the sieve C, therefore, I employ a cylinder, A, which, from the following description, will be seen is not subject to the objection that applies to the sieve.

This cylinder, of which two or more may be used, is preferably of a smaller size than B, and is made to revolve more rapidly by reason of the fact that it receives and must the dispose of the entire charge of grain. It is constructed of a single thickness of metal, indented upon the inside, so as to form cavities $a$, which are about one-third larger than those in the cylinder B, and alternating with these cavities are perforations $b$, extending through the cylinder, which perforations are of a size too small to allow any of the wheat grains to pass through, but large enough to permit fine impurities, such as grass-seed, dirt, &c., to pass through. Now, as the crude grain, with the commingled impurities, is admitted to the elevated end of the cylinder through the delivery-pipe c, and the cylinder revolves, the largest grains of wheat will not remain even in the large cavities long enough to be carried up into a trough, but pass along the inclined bottom of the cylinder and are separated from the bulk of the grain and delivered at the lower end of the cylinder into a suitable chute, d, while the fine seed referred to drop through the small perforations b in the cylinder upon any suitable inclined surface and are carried off. The smaller grains of wheat and the cockle and impurities still remaining are caught by the cavities a and carried up and delivered into a trough, whence they pass into the lower cylinder for final separation.

Now, with respect to constructing the cylinder A with both cavities and perforations, I am aware that it is not new to locate the perforation in the bottom of the indentation or cavity, but this construction gives no bottom to the cavity, and the wheat becomes wedged edgewise into the same in such a manner as fail to fall out at the proper time, and is carried up and delivered into the cockle-trough, at the same time filling up the small holes for the passage of the fine seed, and thus preventing the best preliminary separation of the wheat and impurities. I therefore only claim a cylinder having both the cavities and the perforations when the said cavities and perforations are separate and independent of each other, which arrangement obviates the objection referred to.

Of the devices for rotating the cylinder A, its central shaft D is provided with a pulley, d, which receives motion through a belt from a pulley on one of the drive-shafts of the lower cylinder. The shaft D is journaled in bearings in the supporting frame E E, arranged above the frame of the lower cylinder, and is attached to the terminal band e of the cylinder A by means of radial arms f, through which motion is transmitted to the cylinder. The higher end of the cylinder is free from the shaft, and is provided with a flanged collar, g, which is supported and runs upon specially-constructed rollers h h. The collar g is constructed of an angular shape in cross-section, Fig. 3, with a flanged face, $g^1$, projecting inwardly from the cylinder to prevent the grain from falling out the end of the cylinder, and with a plain broad face, $g^2$, which forms a bearing for the rollers h. These rollers have an outer periphery of rubber or similar elastic material, for securing a soft and easy bearing, and an inner bushing of glass, Fig. 6, or analogous material, which is employed to reduce friction, and render unnecessary the oiling of the bearing, which is objectionable in this connection, for the reason that the oil is liable to gum and drop into the wheat, where it obstructs the cylinder, whence it is difficult to be removed, and prevents the separation of the impurities from the clean grain. These rollers h are journaled upon slotted supporting-arms i i, which are attached to the frame work E by binding-screws, and are adjustable by means of their slots, so as to increase or diminish the inclination of the cylinder.

By having the driving effect of the shaft D thus transmitted to the cylinder only at one end, while the other end of the cylinder is detached or free therefrom, I secure important results, in that I am enabled to carry a trough, F, out the free end of the cylinder, and cause the cockle, &c., (delivered into the trough by the cavities,) in the opposite direction from that of the cleaned wheat, and deliver them at opposite ends of the cylinder, a spiral conveyer, G, being arranged about the shaft D, so as to revolve with it, and carry the cockle, &c., up the incline of the trough or pan, whence it passes to the lower cylinder through a pipe, H. The trough F is swung at one end upon the shaft D, but at the opposite or higher end is rigidly supported upon the pipe H, to which it is attached, which rigid connection prevents any oscillation or swinging of the trough, which is objectionable, for the reason that any lateral movement of the trough removes the catch-board from its position adjacent to the cylinder, causing the catch-board to fail to catch the cockle delivered from the cavities of the cylinder.

In order to catch and convey the grains carried up by the cavities to the trough F, a catch-board, I, Figs. 3 and 4, is employed, which is hinged or loosely connected with the trough at one side s, Fig. 4, and at the other rests from its weight against the inner periphery of the cylinder in such a manner as to be yielding or flexible, so as to rest always against the cylinder, and automatically adjust itself to the same, and thereby accomplish its purpose, notwithstanding any wear which may result to the same. To enable this catch-board the more readily to remove the cockle or grain contained in the cavities a flexible or elastic strip, j, of rubber or other similar material is employed, which, from its close adherence to the side of the cylinder, and its increased frictional contact, serves to remove all of the cockle and wheat grains from the cavities.

I am aware that such flexible strip is not new in this connection, but as the rubber or elastic strip is required to be renewed at times, I make it detachable, and clamp the same between the outer edge of the catch-board and a plate, k, by means of screws l, Fig. 4, which permits the elastic strip to be renewed as often as desired, with but little inconvenience or delay. As the small wheat and cockle pass down the pipe H they are delivered to the smaller end of the large cylinder B, to be further separated.

The construction and arrangement of this cylinder, in the main, is old, being, for the most part, the same as that shown in my previous patent of October 6, 1874. It is constructed of a tapering form, and is rotated by being suspended upon the flanged rollers J J, located upon the two shafts K K, which shafts are driven through bevel-gears by a cross-shaft, L. This cylinder, however, is provided with cavities or indentations, which are smaller, by about one-third, than those of the upper cylinder, in order the better to separate the smaller wheat from the cockle; and in order to successfully indent the cylinder with the cavities, I employ a special alloy or composition of metals for the said cylinder, which enables me to press the cavities in the metal with both metal and dies in a cold state, and without crack or rupture, and at one-half the usual cost; and whereby, also, I am enabled to form a cavity with sharper corners, and to locate, furthermore, about twice as many of such cavities in a given space.

In addition to the other advantages which arise out of the employment of the composition in the cylinder B, there is another important advantage which the composition renders available in the construction of the cylinder. In stamping the indentations either in copper, zinc, or other similar hard metal, the raised dome is made thinner throughout the pressed-up portion upon the outside of the cavity than elsewhere, and the long grains of wheat, in being jammed against the bottom of the cavity from contact with the bottom side of the catch-board, soon wear holes through the thin pressed-up domes. When my composition is employed a different construction of the raised indentation is formed, as shown in Fig. 7, which, instead of being dome-shaped, as when made from hard sheet metal, is of a conical shape, with a much greater thickness at the apex of the cone than upon the sides, due to the crowding of the softer composition down into the bottom of the female die. Thus, while a better form of cavity is made, a better and more durable construction of cylinder is also secured, the increased thickness of metal in the bottom of the cavity resisting, for a longer time, the jamming of the wheat-grains endwise into the same as they are struck by the catch-board.

It will be remembered that the large wheat and the fine seed and impurities had been extracted by the upper cylinder A, while the small wheat and the cockle were delivered through pipe H to the small end of the cylinder B. Now, as the latter revolves the cavities catch and retain the more globular-shaped cockle, Fig. 5, and carry them up above the catch-board I', upon which they fall, and are conducted to the trough F', and thence outside the cylinder to any suitable receptacle, while the more elongated grains of wheat tip over and fall out of the cavities before they are carried up above the catch-board, and consequently pass down the incline bottom of the cylinder to the holes m, Figs. 1 and 3, through which they fall into a receptacle, n, and are afterward conducted to and mixed with the large clean wheat that passes from cylinder A.

In the cylinder B is shown a chute, G', leading from the sieve C, which chute is only used in connection with said sieve, and has no function when the pipe H and cylinder A are employed. This chute G', with trough F' and longitudinal brush H', Figs. 3 and 5, is attached to sieve C, and are together mounted upon springs o o, Figs. 1 and 3, so that in the revolution of transverse shaft J' the cams K' impart a shaking motion to the same.

The catch-board I' of the cylinder B, Figs. 2, 3, and 5, is provided with detachable and adjustable elastic strip j', arranged with plate k' and screws l', in a manner similar to the arrangement shown in Fig. 3, and it is supported in pivoted arms p, which are provided with set-screws q, arranged in spring-bearings r, which devices serve to adjust the catch-board to the inner periphery of the cylinder. In the place of these latter adjusting devices, however, the catch-board may be hinged and automatically adjusted, as in cylinder A.

In the place of the trough F', also, which is arranged to deliver its cockle in the same direction with the wheat, I may employ a shaft with a spiral conveyer, as in cylinder A, which shall deliver the cockle in the opposite direction from the wheat.

Having thus described my invention, what I claim as new is—

1. Two or more revolving cylinders, provided with pockets upon their internal perimeter of different sizes, with the cylinder, having the smaller pockets arranged to receive the materials to be separated from the cylinder or cylinders having larger pockets, substantially as set forth.

2. A revolving cylinder, having inner pockets or cavities, and an inclined bottom, combined with a conveyer and trough, arranged to carry the cleaned wheat in opposite direction from the cockle, substantially as described.

3. The cylinder A, having inner cavities a, and separate intervening perforations b, substantially as and for the purpose described.

4. In a grain-separator, a cylinder, having inner cavities or pockets supported at one end upon and rotated by a central shaft, and supported at its periphery at the other, so as to permit the use of means for delivering the cockle and wheat at opposite ends of the cylinder, as and for the purpose described.

5. The inclined cylinder A attached to the central shaft at one end and free from the same at the other, in combination with trough F, projecting outside of the cylinder at its free end, and the shaft D, carrying conveyer G, arranged to revolve in the trough F, and discharge the cockle at the free end of the cylinder, substantially as and for the purpose described.

6. The combination, with the revolving cylinder in a grain-separator, of supporting-rollers, having an elastic periphery, and a bushing of glass or analogous anti-friction material, for the purpose specified.

7. The catch-board, hinged or pivoted to the receiving trough within the cylinder, and self-adjusting, with respect to the cylinder, by its own weight, substantially as described, and for the purpose set forth.

8. The combination, with the revolving cylinder, of the catch-board, having a detachable and adjustable elastic strip clamped between the edge of catch-board and a longitudinal plate by means of binding-screws, for the purpose described.

9. The cylinder B, having indented cavities upon the inside, pressed up to form conical projections upon the outside, with a greater thickness of metal at the apex of said cone or the bottom of the cavity, for the purpose described.

10. The combination, with the cylinder, supported at one end upon a central driving-axis and free at the other from the same, of the trough F, swung upon the shaft D at one end and projecting outside of the cylinder at the other, and connected with a rigid support, for the purpose described.

HERMANN KURTH.

Witnesses:
SOLON C. KEMON,
A. M. TANNER.